United States Patent
Hrle et al.

(10) Patent No.: US 7,412,460 B2
(45) Date of Patent: Aug. 12, 2008

(54) DBMS BACKUP WITHOUT SUSPENDING UPDATES AND CORRESPONDING RECOVERY USING SEPARATELY STORED LOG AND DATA FILES

(75) Inventors: Namik Hrle, Boeblingen (DE); Jeffrey William Josten, San Jose, CA (US); Thomas Majithia, San Jose, CA (US); James Zu-chia Teng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1041 days.

(21) Appl. No.: 10/600,221

(22) Filed: Jun. 19, 2003

(65) Prior Publication Data
US 2004/0260726 A1    Dec. 23, 2004

(51) Int. Cl.
*G06F 7/00* (2006.01)
*G06F 17/00* (2006.01)

(52) U.S. Cl. .............. 707/104.1; 707/204; 707/200; 707/202; 707/203; 714/47

(58) Field of Classification Search .......... 707/204, 707/200, 202, 203, 104.1
See application file for complete search history.

(56) References Cited
U.S. PATENT DOCUMENTS

| | | | |
|---|---|---|---|
| 5,448,718 A | 9/1995 | Cohn et al. | |
| 5,778,388 A * | 7/1998 | Kawamura et al. | 707/203 |
| 6,078,932 A | 6/2000 | Haye et al. | |
| 6,212,531 B1 | 4/2001 | Blea et al. | |
| 6,785,696 B2 * | 8/2004 | Mosher et al. | 707/204 |

* cited by examiner

*Primary Examiner*—John Breene
*Assistant Examiner*—Giovanna Colan
(74) *Attorney, Agent, or Firm*—Gates & Cooper LLP

(57) ABSTRACT

A method for performing a system level backup of a log-ahead database management system (DBMS) without suspending updates by application programs is described. The DBMS comprises a database mainline system, a backup utility and a restore utility. The data and log records are stored on separate storage volumes. Log records are written to identify objects that require special handling during the point-in-time recovery. The database engine operates normally during a backup except for suspending actions that would alter the file system catalog or write updates across a storage volume boundary; and by freezing the REDO log point in its checkpoint information. The backup utility copies the data volumes first and optionally the log volumes second while updates are allowed. The resulting inconsistencies are resolved either during a DBMS restart or during a point-in-time (PIT) recovery performed by the restore utility.

33 Claims, 5 Drawing Sheets

DBMS BACKUP WITHOUT SUSPENDING UPDATES AND CORRESPONDING RECOVERY USING SEPARATELY STORED LOG AND DATA FILES

FIELD OF THE INVENTION

The invention relates to the field of database management system (DBMS) data backup and recovery and more specifically to backup and recovery for DBMS using a write-ahead logging protocol.

BACKGROUND OF THE INVENTION

In general, most, if not all, DBMS systems are required to recover without loss of data or transactions after some types of system failures without the need to reference system backup data sets. This recovery capability is a normal part of the operation and restarting of the DBMS. Obviously for those failures of a more catastrophic nature, use of backup data is required.

U.S. Pat. No. 4,507,751, Gawlick et al., entitled Method and Apparatus for Logging Journal Data Using a Write Ahead Dataset, issued Mar. 25, 1985, exemplifies a transaction management system wherein all transactions are recorded on a log on a write-ahead dataset basis. As described in this patent, the protocol requires a change to the database is first recorded on the log and only then written to its external storage. The computing apparatus includes volatile storage for storing a log buffer and a non-volatile storage for storing a journal log. Non-volatile storage means are provided for storing in a write-ahead dataset a plurality of short data blocks. The log buffer contents are written to the write-ahead data set responsive to a process epoch occurring before the log buffer is filled. The log buffer contents are written to the journal log upon the log buffer being filled. The redoing or undoing of database changes is made with reference to the write ahead dataset only in the case of a system failure resulting in loss of log buffer data not yet written to the journal log; otherwise database changes are redone or undone with reference to the log buffer or journal log. The method described by Gawlick, et al. includes the requirement that upon the being restarted, the DBMS must have a way to restore the integrity of the data based on the logs.

When a data processing system is in the process of backing up data in either a streamed or batch mode system, each process, task or application within the data processing system is affected, since the processes supporting streamed or batch mode operations are suspended for the duration of the copying. Those skilled in the art will recognize that this event is typically referred to as a "backup window." In contrast to batch mode operations, log based or transaction management applications are processed in the interactive mode. Such transaction management applications eliminate the "backup window" by concurrently updating an on-line dataset and logging the change. However, this type of backup copying results in a consistency described as "fuzzy." That is, the backup copy is not a precise "snapshot" of the state of a dataset/data base at a single point in time. Rather, a log comprises an event file requiring further processing against the database.

As is well known in art, the steps in a computer implementable method can be used to create a computer program product stored on a portable computer usable media. The media with the computer program product stored thereon is an article of manufacture capable of causing a computer system to execute the computer program product and thereby to perform the method. The computer program product may also be transmitted electronically to a computer which stores the program on its media for recall and execution as required.

SUMMARY OF THE INVENTION

The invention is a method and system for performing a system level backup of a DBMS without suspending updates to the database by application programs. A backup according to the method of the invention can be used to restore the DBMS to the time of the backup or for a system level point-in-time (PIT) recovery for backing out application program's errors using the live system's logs. A database management system according to the invention comprises a DBMS mainline system, a backup system utility (BSU) and a restore system utility (RSU).

One embodiment of the DBMS mainline system according to the invention:
- a) makes modifications to data in the database management system using a write-ahead logging protocol;
- b) stores checkpoint information in log records periodically;
- c) stores data on a one set of storage volumes and log records on another set of storage volumes;
- d) writes log records to identify objects that have been updated without log records;
- e) writes log records to identify objects that are created, extended and/or deleted;
- f) when the backup system lock is in use, suspends actions that would alter the file system catalog or write to disk any updates of objects that could extend that object across a storage volume boundary, the suspension is preferably performed by obtains a backup system lock before executing these operations; and
- g) when the backup system lock is in use, freezes the REDO log point in its checkpoint information.

An embodiment of a backup utility according to the invention:
- a) obtains a backup system lock to signal to the DBMS mainline system that a backup is in progress;
- b) records a log apply starting point (corresponding to a last checkpoint) in a location accessible to the restore utility such as a DBMS system table;
- c) copies the data storage volumes to the backup medium first and records information identifying the backup volumes in a control dataset;
- d) copies the log storage volumes to the backup medium second and records information identifying the log backup volumes in a control dataset; and
- e) records backup volume information in an external file system's control dataset so that the restore utility can access the backup volumes.

An embodiment of a restore utility according to the invention:
- a) restores the data volumes from the backup volumes;
- b) performs a point-in-time (PIT) recovery using the log apply starting point and the user specified point-in-time; steps c-f below are part of the point-in-time recovery processing of the logs;
- c) marks objects as "recovery-pending" when a log record identifies the object as having been updated without log records so that subsequent restoration of the first object can be made from an image copy;
- d) processes log records identifying objects which have been newly created by allocating space for these objects;

e) processes log records identifying objects which have been newly extended by allocating additional space for these objects;

f) processes log records identifying objects which have been deleted by freeing space for these objects; and g) sets a mode to indicate that the point-in-time recovery has completed.

Preferably the RSU is a restartable process and records checkpoints periodically to allow the restart to resume at the last checkpoint if an interruption occurs.

In the case where the user wants to restore the system to the time of the backup, the restore utility is not needed, since the restore can be completed by restoring the backed up volumes to the live DBMS and executing a standard restart which will back out uncommitted changes and reapply committed changes based on the logs.

DETAILED DESCRIPTION OF THE INVENTION AND THE PREFERRED EMBODIMENTS

Figure 1:
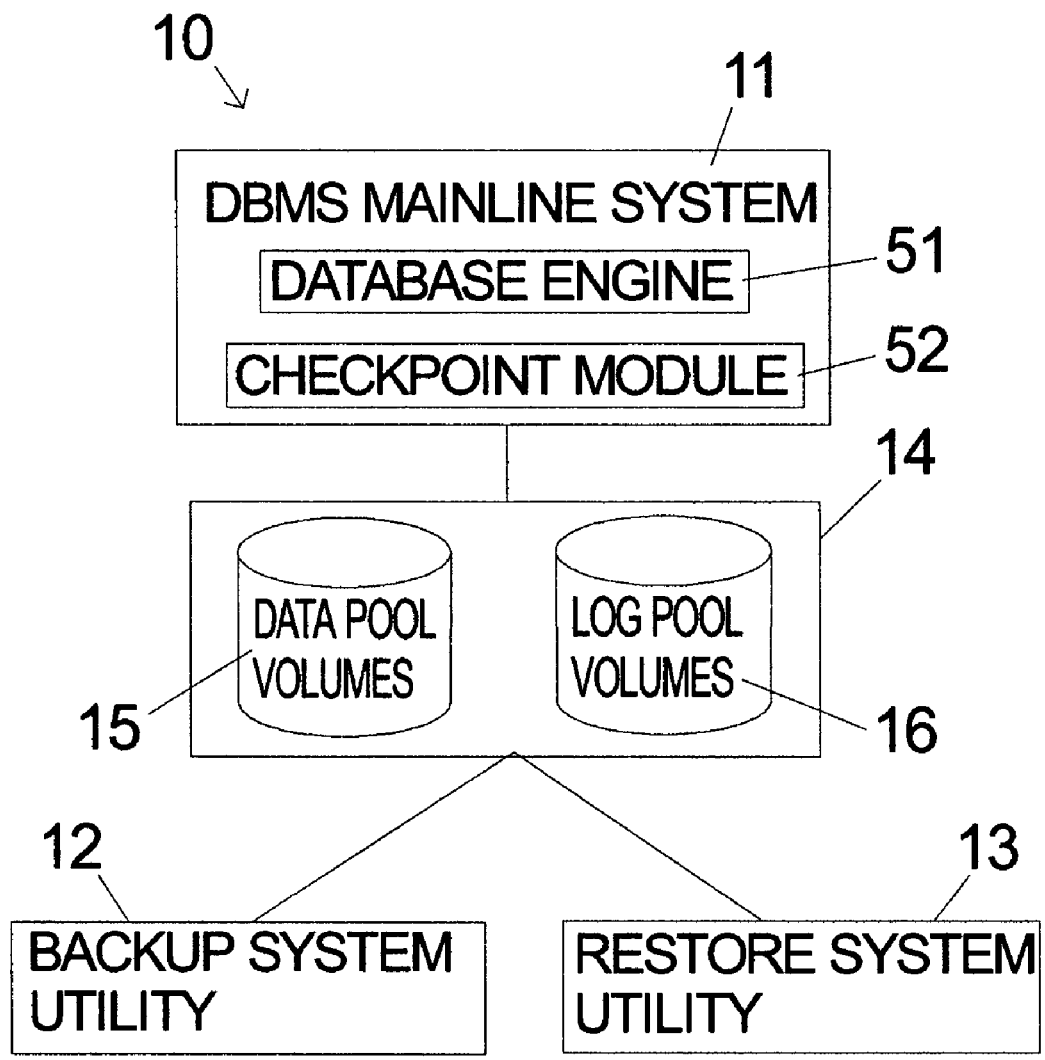
FIG. 1 is an illustration of the components of a DBMS system according to the invention.

An embodiment of a DBMS 10 according to the invention is illustrated in FIG. 1. The DBMS 10 uses the prior art write-ahead logging protocol, i.e., recovery log entries are written to nonvolatile storage before the update is made to the database. The restart after failure process for this type of DBMS uses the recovery log(s) to restore the consistency and integrity of the database after system failures. Each storage subsystem 14 used in conjunction with the invention is required to have a copying capability that is commonly referred to as "time-zero (T0)" copying.

Figure 5:
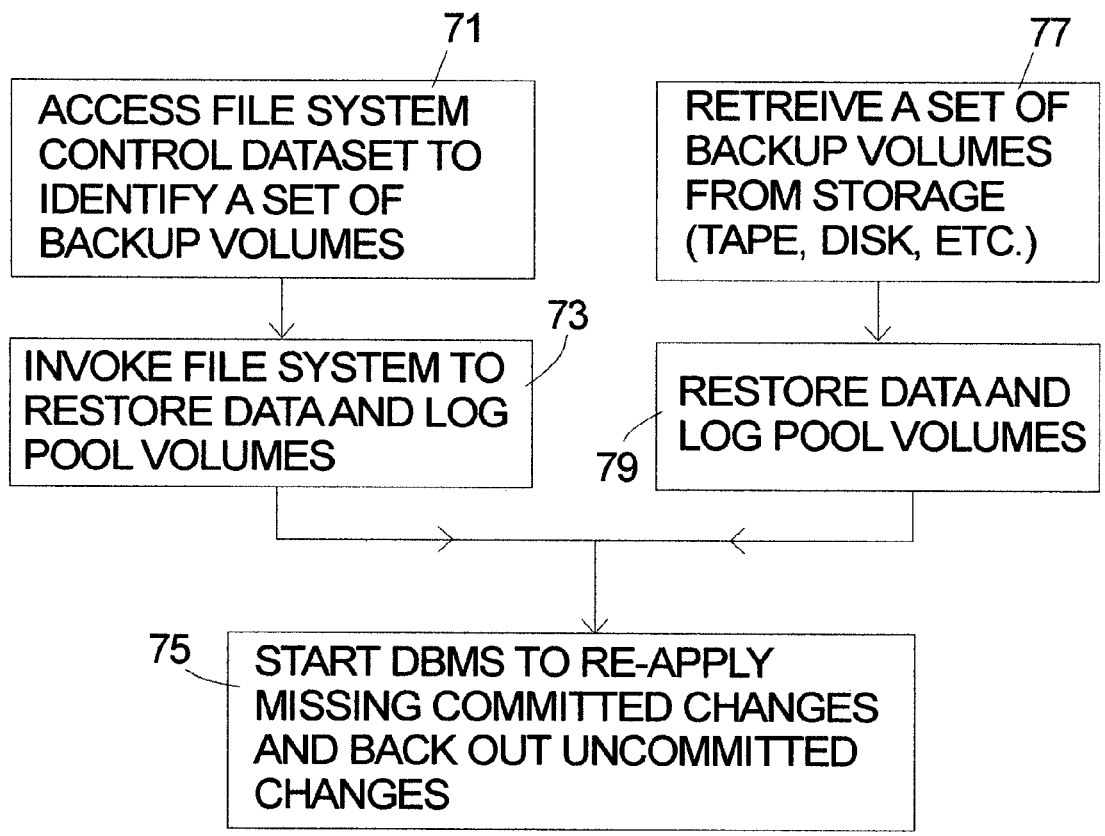
FIG. 5 is an illustration of the steps in a method according to the invention for restoring a database to the time of a previous backup.

If multiple DBMS exist on the computer system, then each DBMS is required to be isolated from the other systems by using separate storage volumes. The backup is a volume level backup performed at the DBMS system level (with the exception noted below). The invention stores data in the data pool volumes 15 and logs in the log pool volumes 16. The log and data must be kept on separate storage volumes. Although the backup data generated by the method of the invention is not transaction consistent, i.e., the backup of the data volume may contain uncommitted changes or may be missing committed changes, the backup of the data and log volumes together are consistent for the DBMS write-ahead logging protocol. A backup according to the method of the invention can be used to restore the DBMS to time of the backup or for a system level point-in-time (PIT) recovery for backing out application programs' errors using the live system's logs. In a remote site disaster recovery where the live logs have been destroyed, the restoration can only be made to the last point where the logs were saved. FIG. 5 will be used to illustrate recovery for the case where the desired recovery point is equal to time of the managed backup system utility (BSU) point. If the backup volumes are in storage, they can be found using the file system's control dataset 71 and the data and log volumes can be restored to the live system 73 using file system utilities. The process is completed by executing the standard DBMS startup process which restores consistency between the logs and the data by backing out uncommitted changes and reapplying committed changes 75. For the case where the backup volumes are on tape or at a remote location, the process must include the step of bringing these volumes back onto the system 77. The backup volumes can then be restored using any available utility 79. Once the backup volumes are restored the process is completed by executing the standard DBMS startup process 75.

For point-in-time recovery, restarting the DBMS followed by the restoration of the data from the backup data pool volumes will restore transaction consistency to the database at the selected point-in-time. The point-in-time recovery uses the log datasets on the live system volumes, and the backed-up log volumes are not restored. The data in the database cannot be accessed by the database engine until the restore process is completed.

A preferred embodiment of the invention as illustrated in FIG. 1 includes a DBMS Mainline System 11 and two utility programs: the Backup System Utility (BSU) 12 and the Restore System Utility (RSU) 13 which perform the backup and the restore respectively. The DBMS Mainline System 11 preferably further comprises a database engine 51 and a checkpoint module 52. The BSU 12 can be used to take fast, nondisruptive copies of the entire DBMS data and log pool volumes 15, 16 or optionally, only the data volumes 15 can be backed up with appropriate updates being made to the recovery control dataset (RCDS) and the control files of the external system. (Note: The RCDS is used in the prior art.) The BSU must know the location of the pool volumes. This information can be passed to the BSU as an input parameter or a special naming convention can be used. After a successful backup copy has been made the BSU registers the backup information (preferably in the RCDS which is in one of the log volumes already copied to the backup medium). The backup information includes the log scan starting point for a system level PIT recovery, the time and the log point when the backup was completed. The BSU also registers the necessary backup information in the operating system's external file system's control dataset which is not part of the DBMS pools and is not backed up as a part of the database system backup. The information required to locate the backup volumes must be accessible to the RSU at the external file system level.

Figure 2:
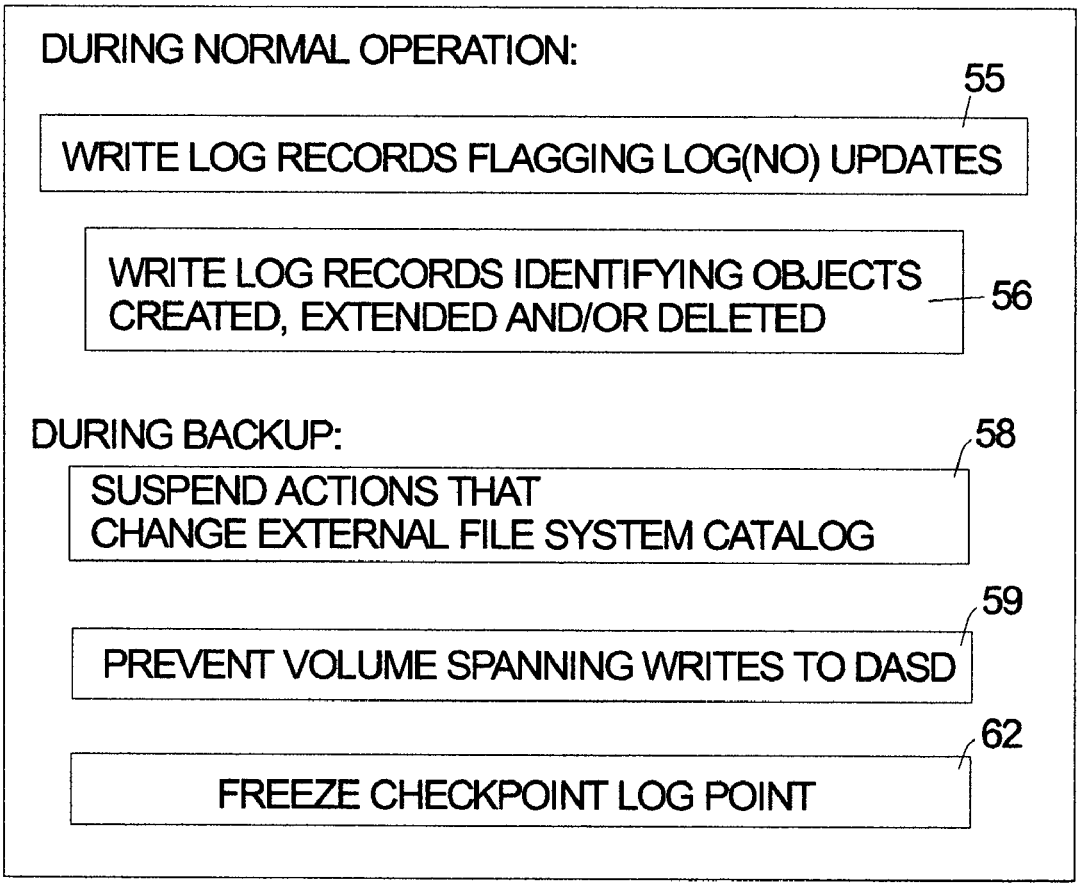
FIG. 2 is an illustration of the internal functions of a DBMS Mainline function according to the invention.

Reference is made to the flowchart in FIG. 2 to describe the steps of a method according to the invention to be performed by the database engine 51 and the checkpoint module 52 which are components of the DBMS mainline system 11. Standard prior art database operation allows for updates with the logging function turned off (LOG(NO)). This can be used, for example, to reorganize the database without generating a massive log. Objects that have been updated without log entries, cannot be restored by reference to the log in a point-in-time recovery process. In order for recovery of objects that have been updated with LOG(NO) after the time of the backup, the DBMS engine 51 needs to make a record of the event, for example, by writing a pageset control log entry for the LOG(NO) event 55 and an image copy needs to be taken. This control log entry does not contain a record of the changes, but rather notes that unlogged changes have been made. This log entry identifies the object for special handling during the restore process which will be described below. Other special handling situations arise for database objects that have been newly created, extended in size or deleted. Information about these events must also be recorded in the logs by the DBMS engine 56.

While most operations of normal database processing can continue while a backup according to the invention is in progress, there are some restrictions. In general, pages are allowed to be updated in memory, as well as, being written to storage during the backup. (Note: Pages are a segment of data of a fixed size, e.g., 4 k or 32K, that are used for I/O management.) The fact that application programs do not need to be suspended or quiesced is an advantage of the invention over the prior art. Preferably a BSU lock is used to signal the checkpoint module 52 that a backup is in progress and, therefore, that it must freeze the log apply starting point in its system checkpoint logs until the BSU job has completed as signaled by the release of the BSU lock. Preferably the database engine 51 uses the lock to serialize restriction operations. To achieve the serialization, the database engine 51 obtains the lock before executing any of the restricted operations. If the lock is currently held by the BSU, the task will be suspended until the lock is released. One restriction is that actions that change external file system's catalog must be temporarily suspended until the backup is finished 58. These actions include the creation/deletion/extension of table/index files. A second restriction is that objects that span across volume boundaries can be updated in memory, but not on disk, while a volume level backup is being taken 59. In the many systems that do not allow volume-spanning objects, this restriction is not applicable. In database systems that allow a single database page to span two different storage volumes, these page write I/O's need to be suspended while the backup is in process in order to prevent partially written pages on the copied volumes.

Figure 3:
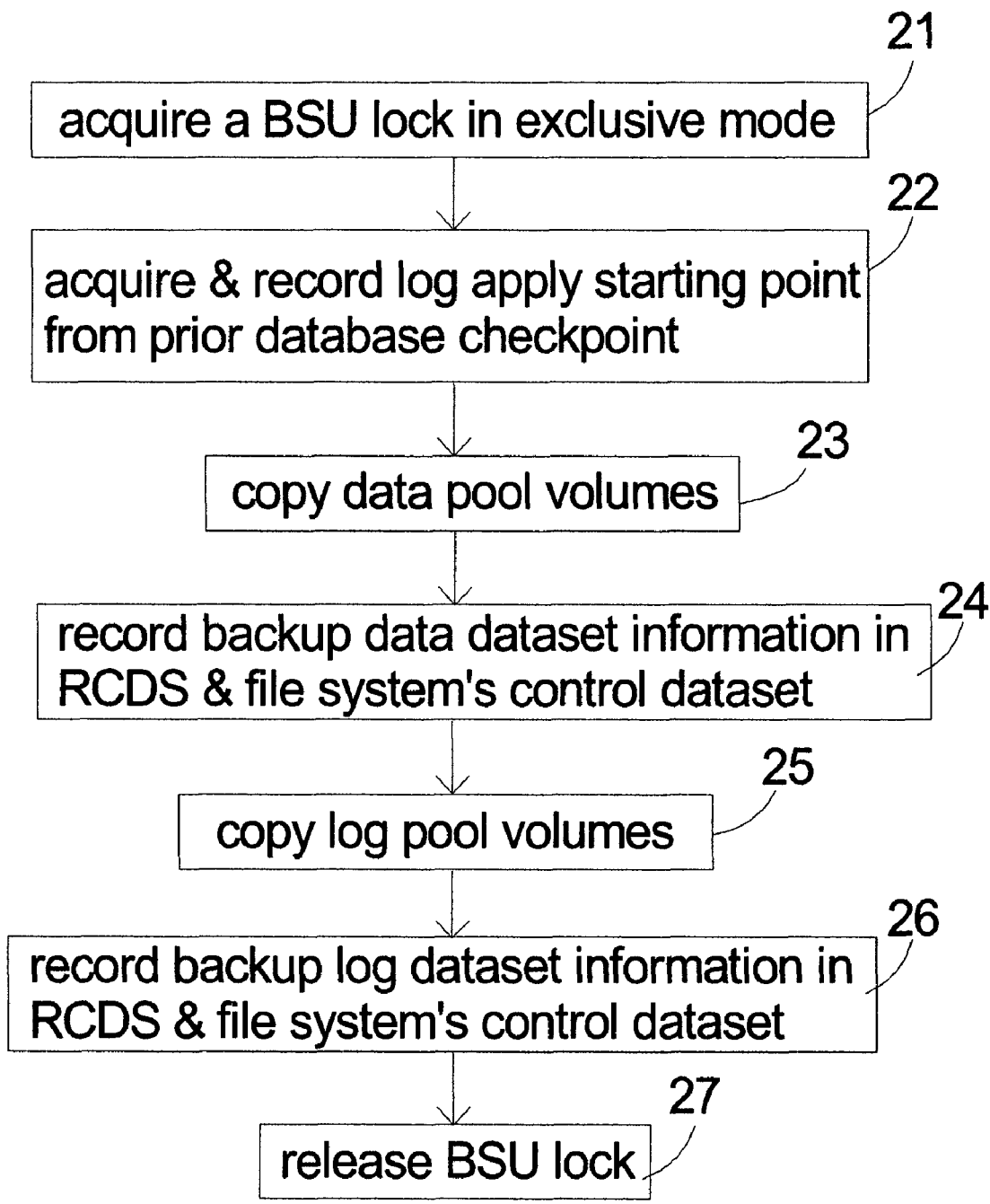
FIG. 3 is an illustration of the steps in a method according to the invention for backing up a database.

Reference is made to the flowchart in FIG. 3 to describe the steps of a method according to the invention of backing up a database. The first step in performing a backup according to the invention is to acquire the BSU lock preferably in exclusive mode 21. This lock is used by the mainline database system as described above.

The next step performed by the BSU is to acquire and record the log apply starting point in a selected position (e.g. the first page) in a DBMS system table for the system PIT recovery 22. The log apply starting point must be far enough back in time to allow the log apply process in the RSU to access the last database checkpoint and open logs to access the database data. The database checkpoint is used to obtain metadata that is necessary to open the files associated with the database. The log apply starting point may be prior to the checkpoint in order to capture updates that were in memory at the time of checkpoint and had not been written to disk. Otherwise, the log apply starting point will correspond to the time of the checkpoint.

The actual copying of the data copy pool volumes 23 is started at this point. As noted above the copying should use the T0 advanced copy function of the storage subsystem. The backup for all of the data volumes can be performed in parallel. When the data volumes are backed up, the backup volume information is registered in the live copy of the RCDS and in the file system's control dataset 24. The backup volume information must be recorded and be accessible to the RSU at a subsequent time. The live copy of the RCDS containing the backup volume information will be saved when the log volumes are copied.

Upon completion of the backup of the data volumes, the copying of the log volumes is performed 25. Once the log volumes are backed up, the backup volume information is registered in the live RCDS and in the file system's control dataset 26. This last change to the live RCDS is not backed up. The BSU lock is released 27 to indicate the completion of the backup process.

Figure 4:
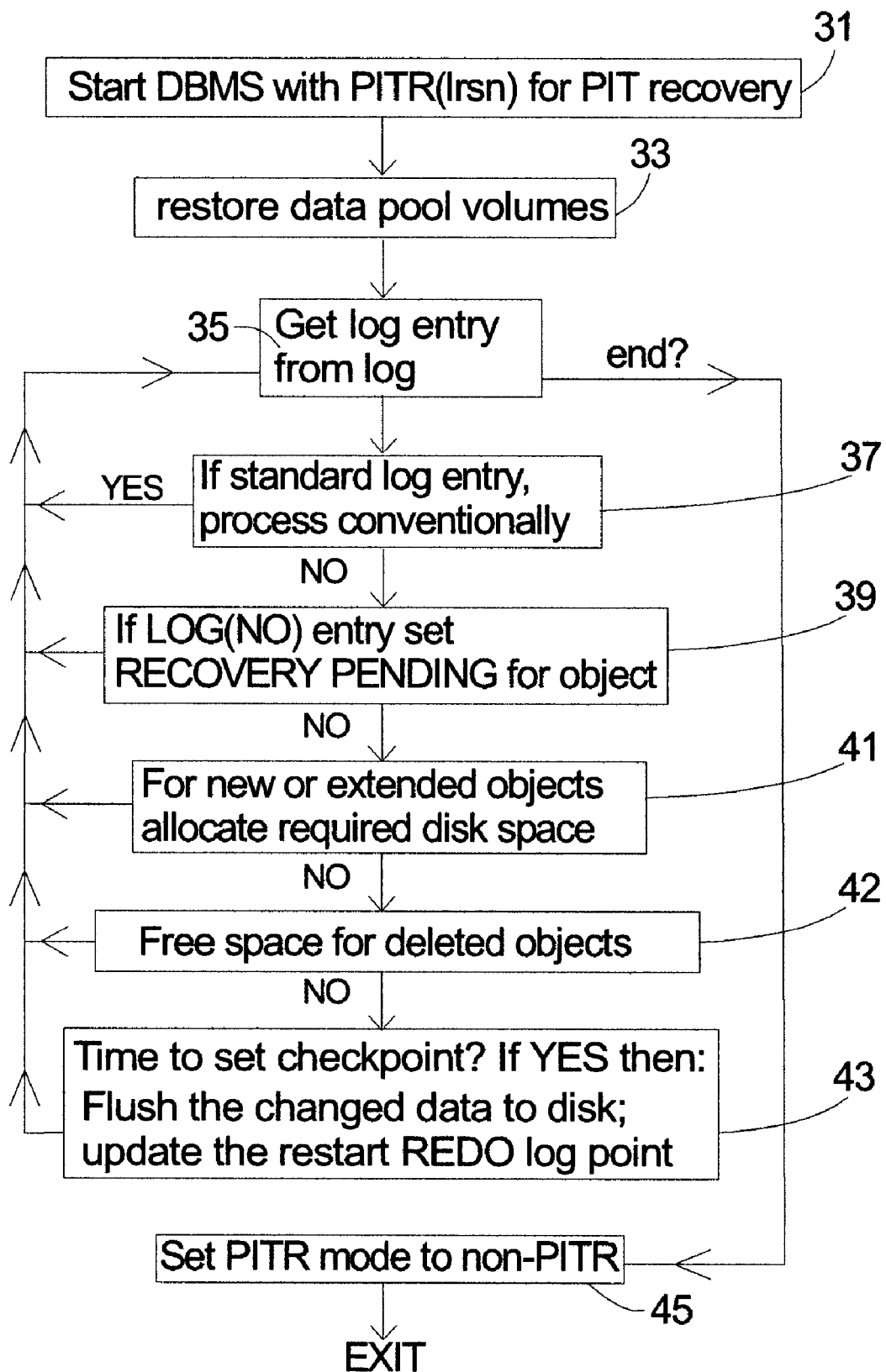
FIG. 4 is an illustration of the steps in a method according to the invention for restoring a database to a selected point-in-time after a previous backup.

Reference is made to the flowchart in FIG. 4 to describe the steps of a method according to the invention of restoring a database to a point-in-time using backup files created according to the invention. In a preferred embodiment the recovery process is executed by a Restore System Utility (RSU) 13 as shown in FIG. 1. The RSU will perform a system level PIT recovery. When the DBMS system is restarted, the PITR (LSRN) restart option is used 31. The "log record sequence number (LSRN)" is a pointer into the log record specified by the user/administrator specifies a point-in-time for the recovery. During restart the DBMS should not access data in the database which can either be inconsistent with the truncated recovery logs or be nonexistent having been destroyed in a failure incident. After the DBMS is restarted in PITR mode, the RSU is executed to perform the actual system level PIT recovery. Typically there will be more than one set of backup volumes recorded in the system. The PITR(LSRN) recovery point dictates which backup set is to be used, i.e., the last backup set before the PITR(LSRN) recovery point is used. The last backup volume set found based on the time and date information in the RCDS. The example of FIG. 4 assumes that the LSRN point is after the last backup and that an image copy was made after the completion of any LOG(NO) operations.

It should be noted that the backup volumes may have been migrated to tape after the backup utility was run. In this case the tape must be used to reload the volumes to direct access storage. After the data copy pool 33 volumes are restored by the RSU, the log apply phase 35 is entered. The previously saved log apply starting point is obtained from the selected system table on which it was stored during the backup. The log volumes are not restored. The log datasets are used from the live DBMS system volumes or from a saved log stream captured after the backup. The processing of the log entries is performed in the customary way 37 except for the special cases discussed below.

Since legacy systems allow updates to be made on a persistent database object without logging (LOG(NO)) special handling is required for these entries. Using an image copy to restore this category of objects is standard in the prior art. It is standard procedure for DBMS operator to perform the image copy after the completion of a LOG(NO) operation. In order for recovery of these objects to be performed according to the invention, the DBMS mainline system needs to make a record of these events, for example, by writing a pageset control log entry for the LOG(NO) event. When the LOG(NO) entry in the control log is found during the restore process, the database object is set in a "Recovery Pending" state 39; Once set in this state the prior art method is used to restore the object is from an image copy taken subsequent to the LOG(NO) operation.

Another special handling situation arises for database objects that have been newly created or extended in size. Information about these events must be recorded in the logs by the DBMS mainline system in order for recovery of these objects to be performed according to the invention. The DBMS system needs to write storage volume information in the dataset extend logs to tell the recovery process to allocate the storage for these objects 41. The database catalog has been relied upon in the prior art to supply information on new objects, but the method of the invention cannot rely on the catalog since it may be inconsistent due to the fact that updates are allowed during the backup process.

Objects that have been deleted since the backup must also be handled as a special case. Log entries for the deletion of objects are processed by removing the objects from the catalog and releasing their disk space 42.

In a preferred embodiment the RSU is made restartable. This is desirable since the recovery process can take a very long time for large databases. If the RSU is not restartable, it will have to start over from the beginning if there is a system failure during the recovery process. Obviously for some types of system failure such as a storage system failure, starting over from the beginning is required, but for some types of failures such as a power interruption, it would be advantageous to use at least some of the recovery work that had been completed. In order to be restartable, the RSU the can take an internal checkpoint periodically during the recovery, for example, after a selected number of log entries have been processed or a selected time has elapsed. At each checkpoint the RSU flushes the changed data to disk storage and updates the restart REDO log point forward in the header area of a system table 43. The DBMS PITR mode will also be remembered in the logs to force the DBMS to restart the RSU. When the RSU completes the recovery, the DBMS PITR mode will be set to a non-PITR mode 45.

The DBMS can now begin processing on all objects except those that have been flagged as "recovery pending." The recovery of these objects from image copies is preferably performed outside of the RSU although the RSU might assist by listing the objects. One method of achieving the restoration of "recovery pending" objects is for the database administrator to execute an appropriate job. The image copies must be available to complete the restoration.

The preferred embodiments of the invention may be implemented as a method, apparatus or article of manufacture using standard programming and/or engineering techniques to produce software, firmware, hardware, or any combination thereof.

Although the preferred embodiments of the invention have been described, those skilled in the art will recognize that other embodiments of the invention are readily achieved. While various preferred embodiments have been shown and described, it will be understood that there is no intent to limit the invention by such disclosure, but rather, it is intended to cover all modifications and alternate constructions falling within the spirit and scope of the invention as defined in the appended claims. For example, the present invention should not be limited by computer operating system, database management system, database management model, directory structure, DBMS-file linking technology, type of user interface, computer hardware platform, e-commerce platform, network operating system, archiving software, or archiving hardware. In addition, the present invention can be implemented locally on a single PC, connected workstations (i.e. networked-LAN), across extended networks such as the Internet or using portable equipment such as laptop computers or wireless equipment (RF, microwaves, infrared, photonic, etc.)

What is claimed is:

1. A database management system comprising:
    a mainline database system that makes modifications to data in the database management system using a write-ahead logging protocol; stores data on a first set of storage volumes and stores log records on a second set of storage volumes; restores consistency between the log records and the data during a restart, and while a backup system lock is held by a backup utility, continues updating objects except for suspending actions that change an external file system catalog, suspending writing updates of objects that extend across a storage volume boundary; and freezing a REDO log point in checkpoint information while the backup system lock is taken by the backup utility.

2. The database management system of claim 1 further comprising a backup utility that obtains the backup system lock before starting a backup process; copies the first set of storage volumes to a first set of backup volumes; records information identifying the first set of backup volumes in a dataset.

3. The database management system of claim 2, wherein the backup utility copies the second set of storage volumes to a backup medium; and records backup volume information for the second set of storage volumes in the dataset.

4. The database management system of claim 2 further comprising a restore utility that performs a point-in-time recovery using the data from the first set of backup volumes, a user specified point-in-time, and the logs on the second set of storage volumes.

5. The database management system of claim 4 wherein the restore utility marks a first object as recovery-pending when a log record identifies the first object as having been updated without log records so that subsequent restoration of the first object can be made from an image copy.

6. The database management system of claim 1 wherein the mainline database system writes log records to identify objects that have been updated without log records and writes log records to identify objects that have been created, extended and/or deleted.

7. The database management system of claim 1 wherein the mainline database system stores checkpoint information periodically and the backup utility records a log apply starting point corresponding to a last checkpoint information storage point.

8. The database management system of claim 1 wherein the mainline database system obtains the backup system lock before updating objects that change an external file system catalog or that extend across a storage volume boundary.

9. A database management system, that performs a backup without suspending updates and the backup can be restored using a write-ahead logging protocol restart, comprising:
    means for modifying data in the database management system using a write-ahead logging protocol;
    means for restoring consistency between log records and the data during a restart;
    means for storing data on a first set of storage volumes and storing log records on a second set of storage volumes;
    means for freezing a REDO log point in checkpoint information while a backup system lock is taken; and
    means for continuing to update the data while the backup system lock is taken, except for suspending actions that change an external file system catalog, and except for suspending writing updates of objects that extend across a storage volume boundary.

10. The database management system of claim 9 further comprising:
    means for obtaining the backup system lock before starting a backup process; for copying the first set of storage volumes to a first set of backup volumes; and for recording information identifying the first set of backup volumes in a recovery control dataset and in an external file system's control dataset.

11. The database management system of claim 10 further comprising means for copying the second set of storage volumes to a second set of backup volumes; and means for recording information identifying the second set of backup volumes in the recovery control dataset and in the external file system's control dataset.

12. The database management system of claim 10 further comprising means for restoring data from the first set of backup volumes to the first set of storage volumes and for performing a point-in-time recovery using a user specified point-in-time, and the logs on the second set of storage volumes.

13. The database management system of claim 12 wherein the means for restoring data further comprises means for marking a first object as recovery-pending when a log record identifies the first object as having been updated without log records so that subsequent restoration of the first object can be made from an image copy; processing log records identifying a second object which has been newly created by allocating space for the second object; processing log records identifying a third object which has been newly extended by allocating additional space for the third object; processing log records identifying a fourth object which has been deleted by freeing space for the fourth object; and means for setting a mode to indicate that the point-in-time recovery has completed.

14. The database management system of claim 9 further comprising means for writing log records to identify objects that have been updated without log records and writing log records to identify objects that have been created, extended or deleted.

15. The database management system of claim 10 further comprising means for storing checkpoint information periodically and the means for backing up the data further comprises means for recording a log apply starting point corresponding to a last checkpoint information storage point.

16. The database management system of claim 9 further comprising means for obtaining the backup system lock before updating objects that change an external file system catalog or that extend across a storage volume boundary.

17. A method of operating a database management system comprising the steps of:
modifying data in the database management system using a write-ahead logging protocol;
restoring consistency between log records and the data during a restart;
storing data on a first set of storage volumes and storing log records on a second set of storage volumes;
freezing a REDO log point in checkpoint information while a backup system lock is taken; and
continuing to update the data while the backup system lock is taken, except for suspending actions that change an external file system catalog, and except for suspending writing updates of objects that extend across a storage volume boundary.

18. The method of claim 17 further comprising the step of backing up the data and wherein the step of backing up the data further comprises obtaining the backup system lock and after obtaining the backup system lock, copying the first set of storage volumes to a first set of backup volumes.

19. The method of claim 18 further wherein the step of backing up the data further comprises the step of recording information identifying the first set of backup volumes in a recovery control dataset and in an external file system's control dataset.

20. The method of operating the database management system of claim 18 further comprising backing up log records, after backing up the data, by copying the second set of storage volumes to a second set of backup volumes.

21. The method of operating the database management system of claim 18 further comprising the steps of restoring data from the first set of backup volumes to the first set of storage volumes and performing a point-in-time recovery using a user specified point-in-time, and the log on the second set of storage volumes.

22. The method of operating the database management system of claim 21 wherein the step of performing a point-in-time recovery further comprises the steps of marking a first object as recovery-pending when a log record identifies the first object as having been updated without log records so that subsequent restoration of the first object can be made from an image copy; processing log records identifying a second object which has been newly created by allocating space for the second object; processing log records identifying a third object which has been newly extended by allocating additional space for the third object; processing log records identifying a fourth object which has been deleted by freeing space for the fourth object; and setting a mode to indicate that the point-in-time recovery has completed.

23. The method of operating database management system of claim 17 further comprising writing log records to identify objects that have been updated without log records and writing log records to identify objects that have been created, extended or deleted.

24. The method of operating the database management system of claim 18 further comprising storing checkpoint information periodically and the step of backing up the data further comprises recording a log apply starting point corresponding to a last checkpoint information storage point.

25. The method of operating the database management system of claim 17 wherein the step of continuing to update the data while a backup system lock is taken further comprises obtaining the backup system lock before updating objects that change an external file system catalog or that extend across a storage volume boundary.

26. An article of manufacture comprising computer usable media including at least one computer program recorded therein that is capable of causing a computer system to perform a method of operating a database management system comprising the steps of:
modifying data in the database management system using a write-ahead logging protocol;
restoring consistency between log records and the data during a restart;
storing data on a first set of storage volumes and storing log records on a second set of storage volumes;
freezing a REDO log point in checkpoint information while a backup system lock is taken; and
continuing to update the data while the backup system lock is taken, except for suspending actions that change an external file system catalog, and except for suspending writing updates of objects that extend across a storage volume boundary.

27. The article of manufacture of claim 26 wherein the method further comprises the step of backing up the data and wherein the step of backing up the data further comprises obtaining the backup system lock and after obtaining the backup system lock, copying the first set of storage volumes to a first set of backup volumes.

28. The article of manufacture of claim 27 wherein the step of backing up the data further comprises the step of recording information identifying the first set of backup volumes in a control dataset.

29. The article of manufacture of claim 27 wherein the method further comprises backing up log records, after backing up the data, by copying the second set of storage volumes to a second set of backup volumes.

30. The article of manufacture of claim 29 wherein the method further comprises recording information identifying the second set of backup volumes in the recovery control dataset and in the external file system's control dataset.

31. The article of manufacture of claim 27 wherein the method further comprises the steps of restoring data from the first set of backup volumes to the first set of storage volumes and performing a point-in-time recovery using a user specified point-in-time, and the logs on the second set of storage volumes.

32. The article of manufacture of claim 31 wherein the step of performing a point-in-time recovery further comprises the steps of marking a first object as recovery-pending when a log record identifies the first object as having been updated without log records so that subsequent restoration of the first object can be made from an image copy; processing log records identifying a second object which has been newly created by allocating space for the second object; processing log records identifying a third object which has been newly extended by allocating additional space for the third object; processing log records identifying a fourth object which has been deleted by freeing space for the fourth object; and setting a mode to indicate that the point-in-time recovery has completed.

33. The article of manufacture of claim 26 wherein the step of continuing to update the data while a backup system lock is taken further comprises obtaining the backup system lock before updating objects that change an external file system catalog or that extend cross a storage volume boundary.

* * * * *